(12) United States Patent
Chism

(10) Patent No.: US 10,123,526 B2
(45) Date of Patent: *Nov. 13, 2018

(54) MOUSE AND RODENT TRAP

(71) Applicant: Gary Chism, Eckert, CO (US)

(72) Inventor: Gary Chism, Eckert, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/971,504

(22) Filed: May 4, 2018

(65) Prior Publication Data

US 2018/0249697 A1    Sep. 6, 2018

Related U.S. Application Data

(63) Continuation of application No. 14/972,492, filed on Dec. 17, 2015, now Pat. No. 9,961,892.

(60) Provisional application No. 62/160,991, filed on May 13, 2015.

(51) Int. Cl.
  *A01M 23/10*    (2006.01)
  *A01M 23/04*    (2006.01)

(52) U.S. Cl.
  CPC ............ *A01M 23/10* (2013.01); *A01M 23/04* (2013.01)

(58) Field of Classification Search
  CPC .......................... A01M 23/10; A01M 23/04
  See application file for complete search history.

(56) References Cited

U.S. PATENT DOCUMENTS

| | | |
|---|---|---|
| 2,122,147 A | 6/1938 | Lamp |
| 2,579,093 A | 12/1951 | Roesner |
| 2,619,765 A | 12/1952 | Sees |
| 3,528,191 A | 9/1970 | Hand |
| 4,662,101 A | 5/1987 | Fisher |
| 4,706,408 A | 11/1987 | Mellard |
| 4,876,821 A | 10/1989 | Benzie |
| 5,517,784 A | 5/1996 | Sedore |
| 5,528,852 A | 6/1996 | Sarff |
| D382,039 S | 8/1997 | Zyra |
| 5,720,126 A | 2/1998 | Lamb |
| 5,996,274 A | 12/1999 | Smith et al. |
| 6,212,819 B1 | 4/2001 | Edwards |
| 7,627,981 B1 | 12/2009 | Doster et al. |
| 8,205,377 B1 | 6/2012 | Wilson |
| 2010/0132244 A1 | 6/2010 | Ridge |

*Primary Examiner* — Christopher P Ellis
(74) *Attorney, Agent, or Firm* — Trenner Law Firm, LLC; Mark D. Trenner

(57) ABSTRACT

An example mouse and rodent trap includes a base for arrangement over a catch basin. A shaft is supported by the base. A bait drum is mounted on the shaft. A brace rotatably supports the shaft. The brace extends from the base on each side of an opening formed in the base. The shaft is provided between each brace.

16 Claims, 8 Drawing Sheets

MOUSE AND RODENT TRAP

This application is a continuation of U.S. patent application Ser. No. 14/972,492 filed Dec. 17, 2015 titled "Mouse and Rodent Trap" of Gary Chism, which claims the priority benefit of U.S. Provisional Patent Application No. 62/160,991 filed May 13, 2015 titled "Mouse and Rodent Trap" of Gary Chism, each hereby incorporated by reference for all that is disclosed as though fully set forth herein.

BACKGROUND

Variations on mouse traps have been in existence for over a hundred years. The classic mouse trap includes a spring-loaded bar which is released by a pedal when the mouse operates the pedal inadvertently while eating the bait placed on the pedal. The bar snaps very quickly and breaks the neck of the mouse. These mouse traps may be viewed as inhumane to some, particularly when the bar only injures the mouse without immediately killing the mouse. To others, the idea of having to handle a dead mouse during removal makes them squeamish. In addition, the classic mouse trap can cause injury to pets and small children who come across a set trap.

DETAILED DESCRIPTION

A mouse or rodent trap is disclosed which may be implemented to capture mice alive or dead.

An example mouse and rodent trap includes a base with an opening formed therein. A plank is formed in the base and extending at least partially across the opening formed in the base. A shaft is supported below the plank. In an example, a first brace is provided on a first side of the opening formed in the base, and a second brace is provided on a second side of opening formed in the base. The shaft is supported between the first brace and the second brace. A bait drum may be provided on the shaft. The shaft and/or the bait drum may rotate. A catch basin is provided below the base.

In an example, a mouse (or other rodent) moves out onto the plank in search of the bait. The mouse or rodent reaches over the side of the plank to reach the bait below the plank. The mouse may reach down toward the bait and fall off of the plank and into a catch basin below the plank. The plank may also bend under weight of a mouse or rodent on the plank reaching down toward bait on the shaft, causing the mouse or rodent to fall from the plank. In addition, the bait drum may rotate causing the mouse to fall off of the plank.

Before continuing, it is noted that as used herein, the terms "includes" and "including" mean, but is not limited to, "includes" or "including" and "includes at least" or "including at least."

Figure 1:
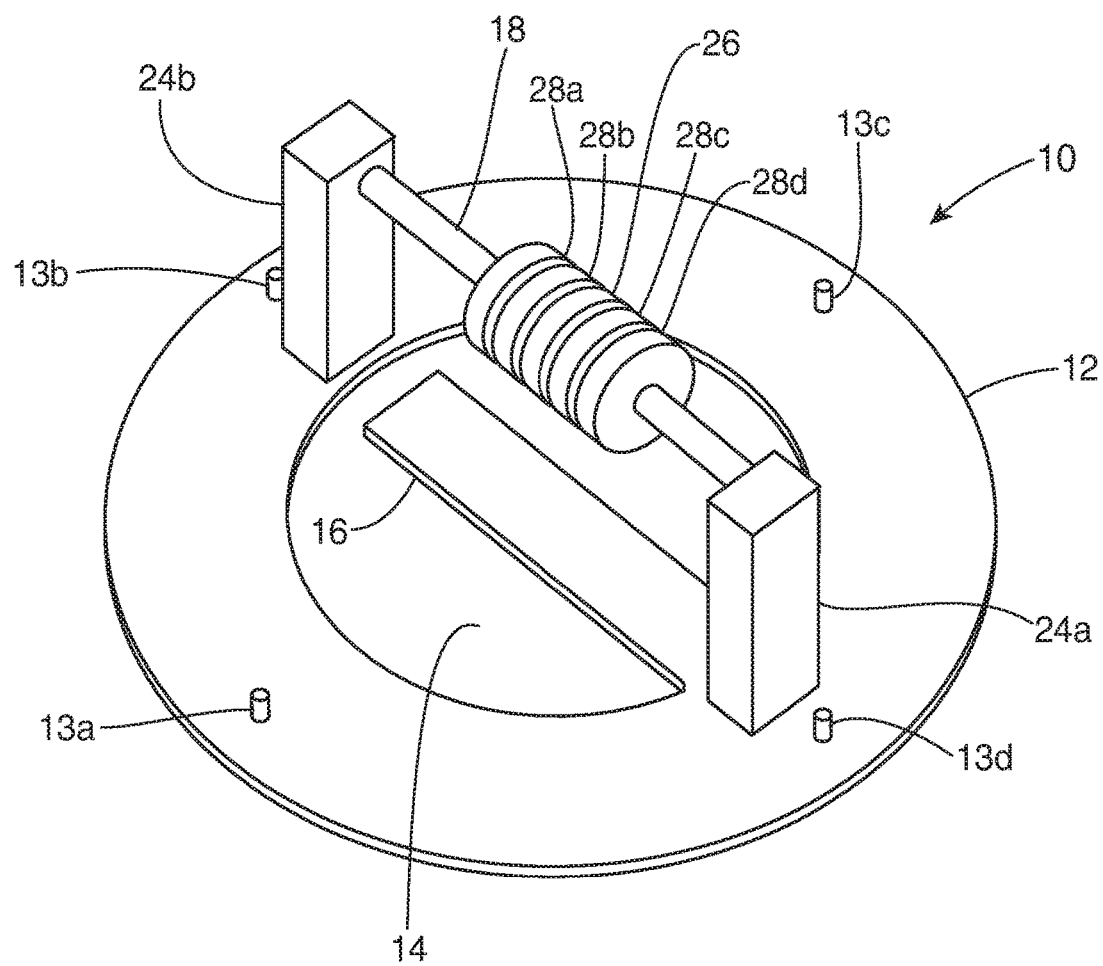
FIG. 1 is a perspective view of an example mouse and rodent trap.
Figure 2:
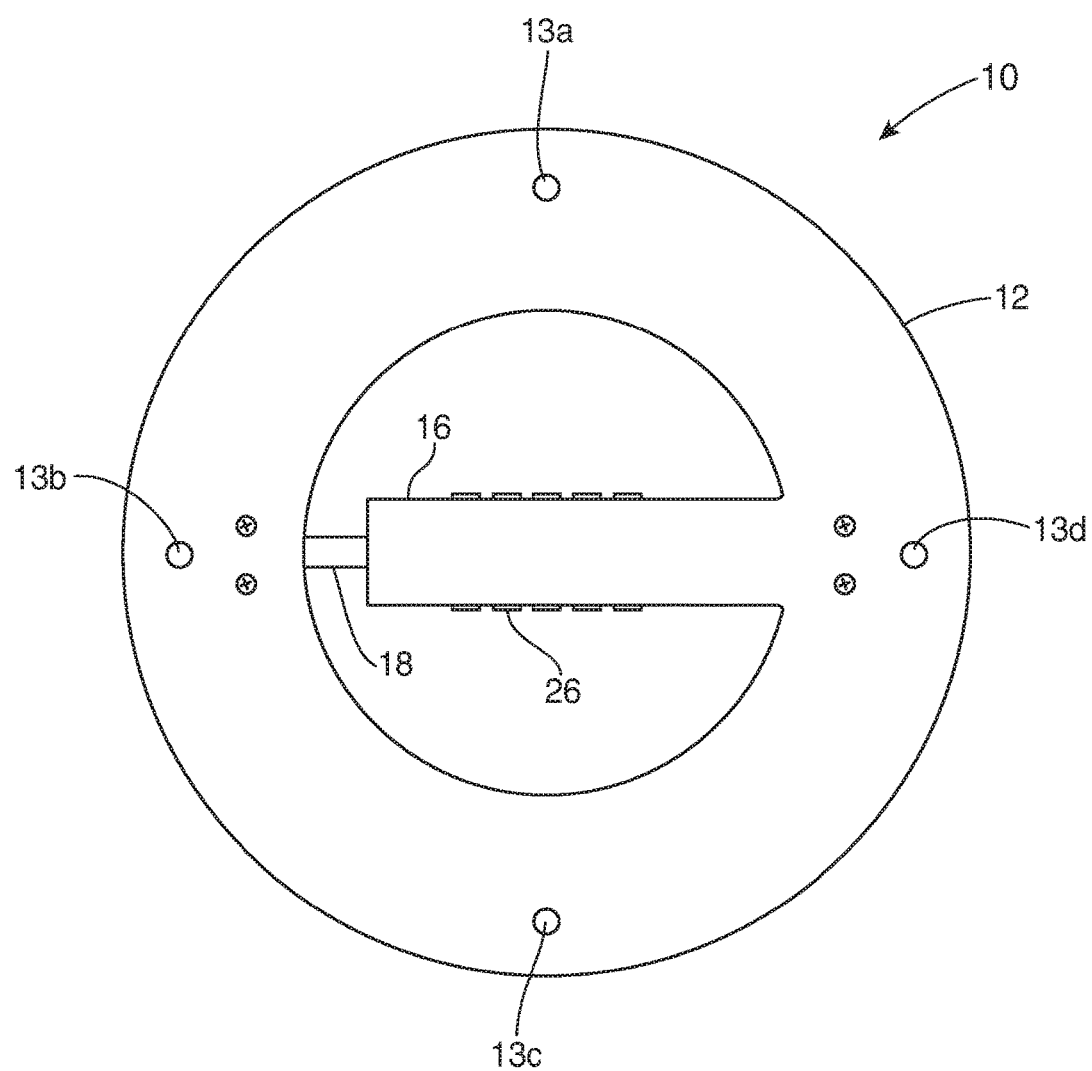
FIG. 2 is a bottom view of an example mouse and rodent trap.
Figure 3:
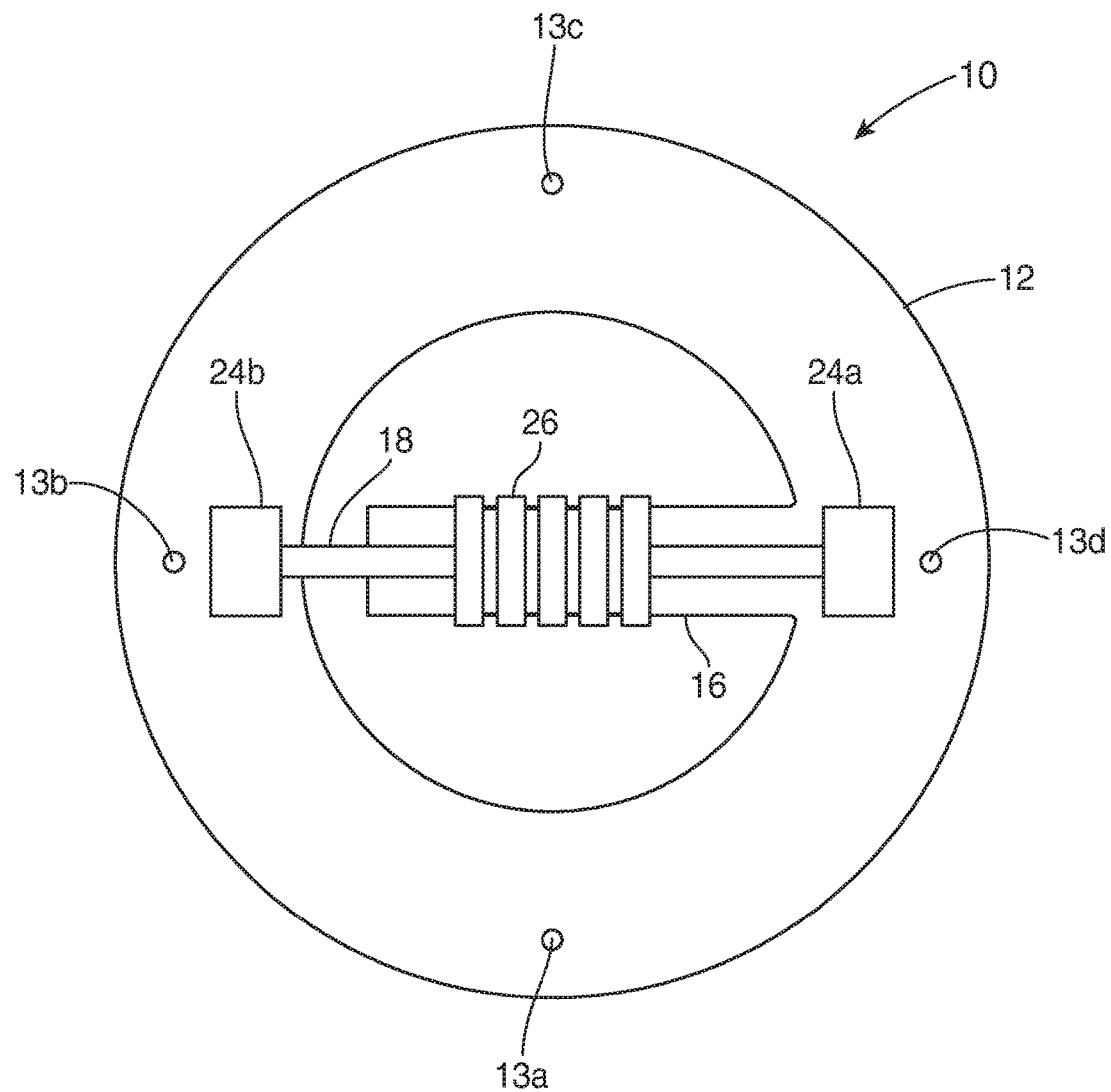
FIG. 3 is a top view of an example mouse and rodent trap.

FIG. 1 is a perspective view of an example mouse and rodent trap 10. FIG. 2 is a bottom view of an example mouse and rodent trap 10. FIG. 3 is a top view of an example mouse and rodent trap 10. In an example, the trap 10, and its various components, are made of plastic. It will be appreciated, however, that the trap 10, and its various components, may be manufactured of any suitable material and may be any suitable dimensions.

In an example, the trap 10 includes a base 12 with an opening 14 formed therein. In this example, the base 12 is shown generally circular in shape. In an example, the opening 14 is a 6 inch circle cut out in the base 12. However the base 12 is not limited to any particular shape. Likewise, the opening 14 is shown generally circular in shape, however the opening 14 is not limited to any particular shape.

In an example, the trap 10 includes a plank 16 supported on the base 12 and extending at least partially across the opening 14 formed in the base 12. For example, the plank 16 may include a strip of plastic about 1 inch wide by about 6 inches long. The plank 16 is attached to one side of the base 12, but loose on the other side, enabling the plank 16 to flex downward.

In the example shown, the plank 16 extends from one side of the base 12 and does not contact the other side of the base 12. However, other configurations are also contemplated. For example, the plank 16 may extend all the way across the opening. In addition, the plank 16 may be formed as part of the base 12, or formed separate from the base and attached to the base.

Figure 4:
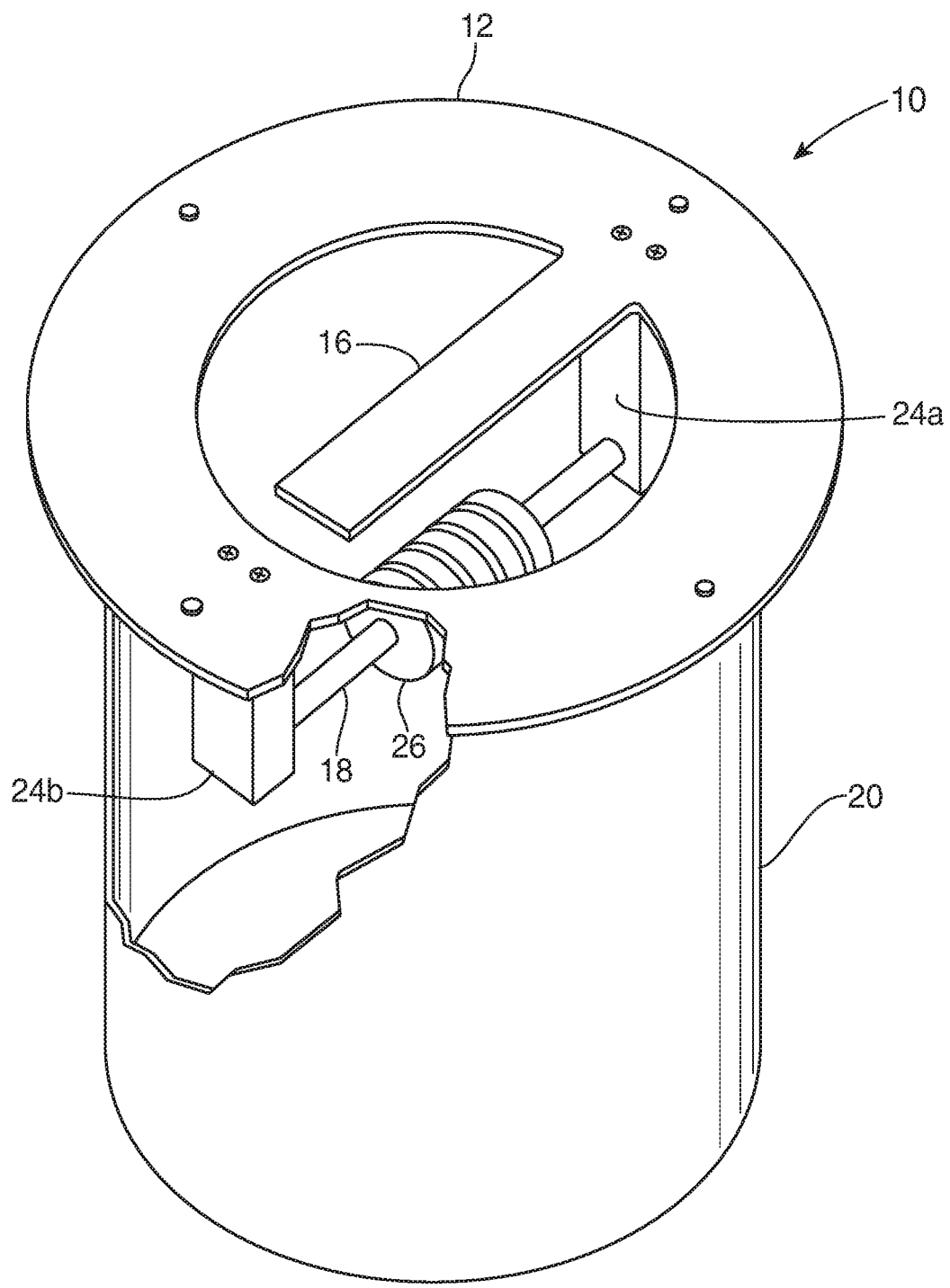
FIG. 4 is a perspective view of the example mouse and rodent trap with a catch basin.

In an example, the trap 10 includes a shaft 18 supported below the plank 16. Although the shaft 18 appears above the plank 16 in FIG. 1, the trap 10 is shown in FIG. 1 as a bottom perspective view. FIG. 4 is a perspective view of the example mouse and rodent trap 10 with a catch basin 20.

Figure 5A:
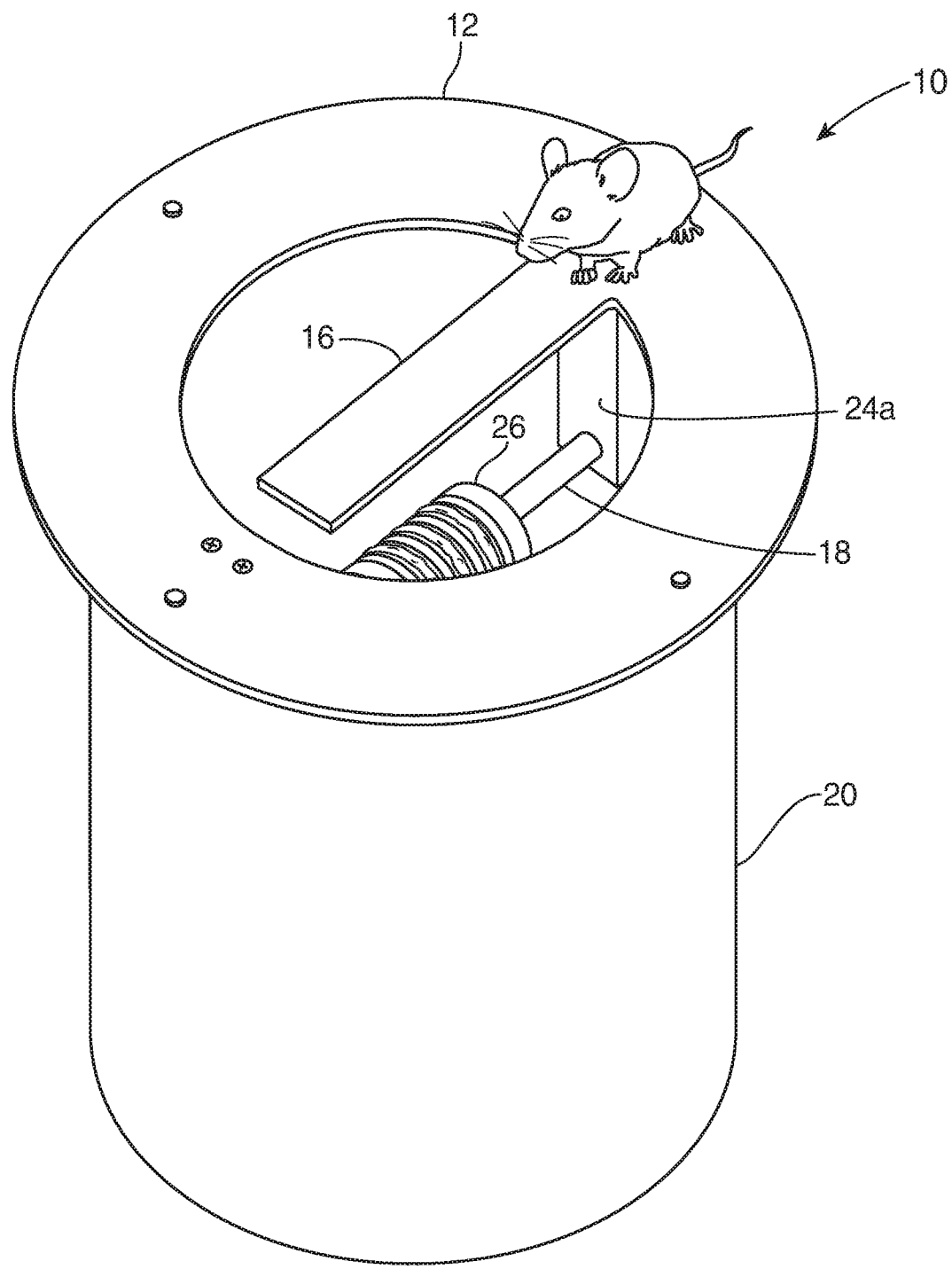
FIGS. 5A-D illustrate implementation of the example mouse and rodent trap to trap a mouse or rodent.
Figure 5B:
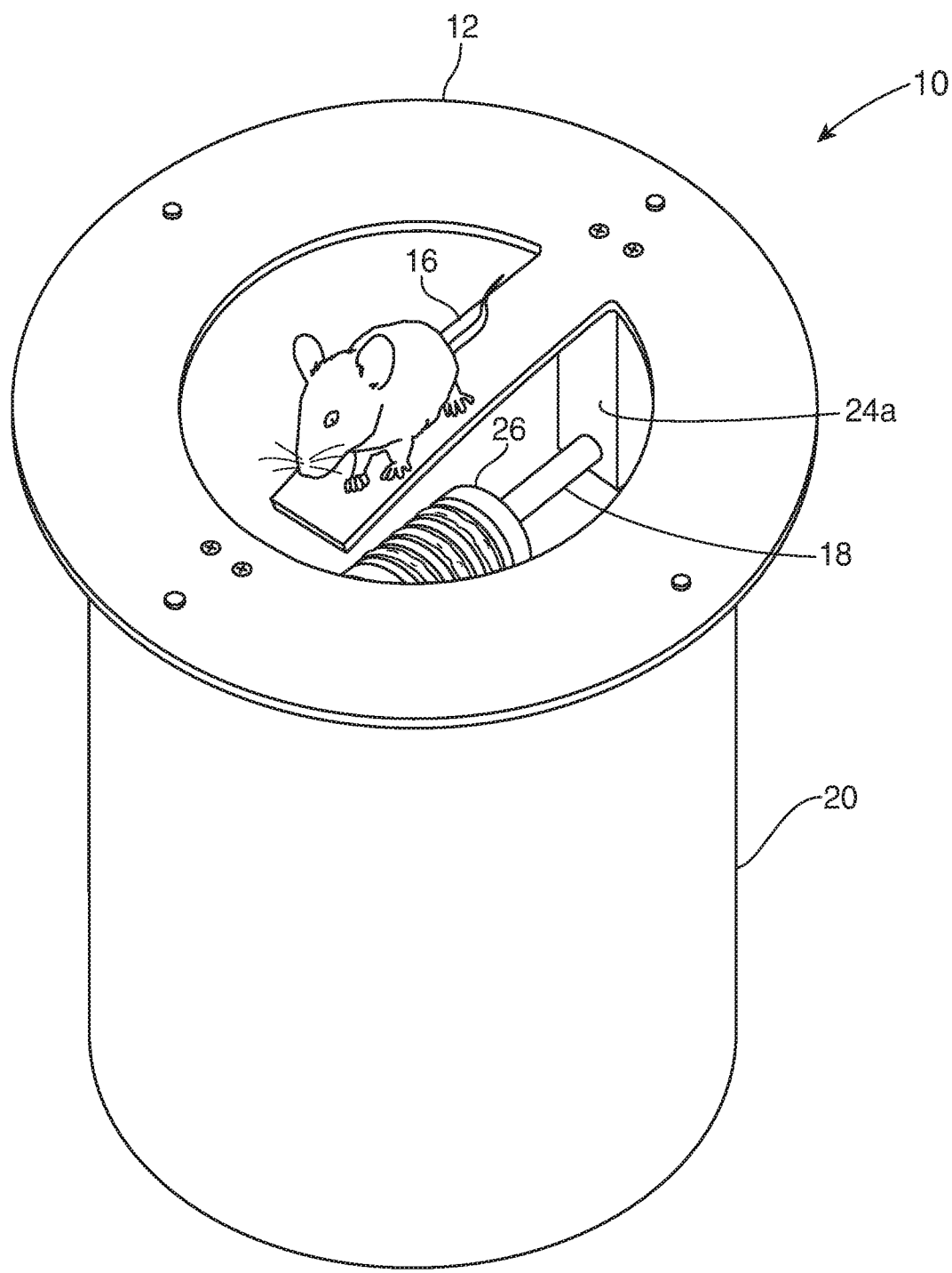
Figure 5C:
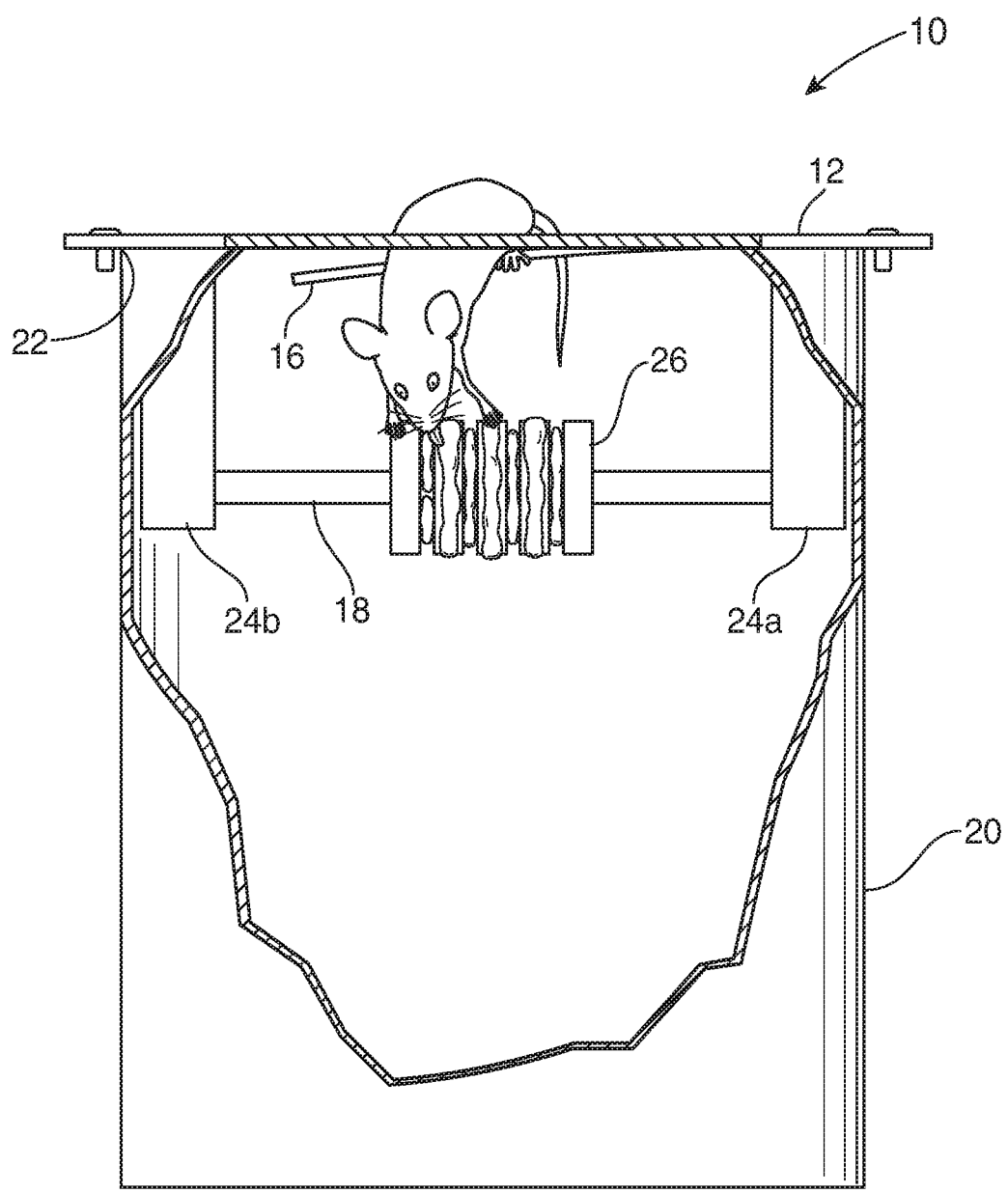
Figure 5D:
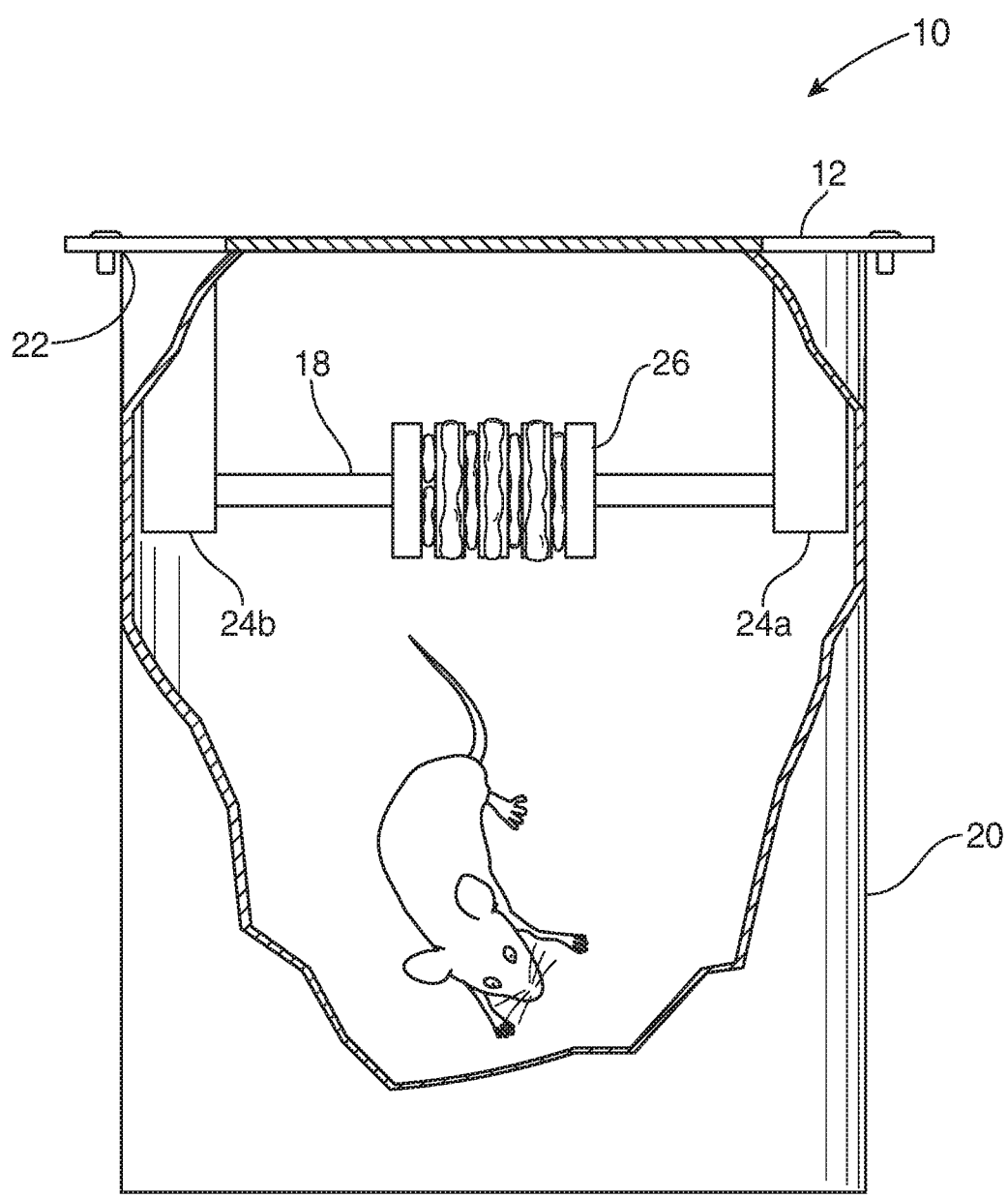

In FIG. 4, the trap 10 is shown in the upright position as it may be used with the catch basin 20. The catch basin 20 may be provided beneath the base 12 such that the shaft 18 is assembled below an upper rim 22 of the catch basin 20 (see FIGS. 5C-D). In the example shown in FIG. 4, the trap 10 may be positioned over the top opening of the catch basin 20 and held in place against sliding by one or more knobs 13a-d. In another example, the trap 10 may be secured to the top opening of the catch basin 20 by one or more clips (not shown) to hold it in place.

The catch basin 20 may be a bucket or other container (e.g., a 5 gallon paint bucket). The catch basin 20 may be filled with water to kill a mouse or rodent that falls into the bucket. Alternatively, the bucket may include a soft material (e.g., about 1 inch deep kitty litter or saw dust) to capture the mouse or other rodent without harming or killing the mouse when the mouse falls into the catch basin 20.

In an example, the trap 10 includes a first brace 24a on a first side of the opening 14 formed in the base 12, and a second brace 24b on a second side of the opening formed in the base 12. The shaft 18 is supported between the first brace 24a and the second brace 24b. In an example, the shaft 18 is rotatably mounted to the braces 24a-b. In another example, the shaft 18 is rigidly mounted between the braces 24a-b.

In an example, a bait drum 26 is mounted to or formed on the shaft 16 (e.g., as part of the shaft 16). In an example, the bait drum 26 is rotatably mounted to the shaft 18. In another example, the bait drum 26 is rigidly mounted to the shaft 18. The bait drum may include ridges and valleys 28a-d. The ridges and valleys 28a-d help retain the peanut butter or other bait spread on the bait drum 26, making it more difficult for the mouse or rodent to remove, hence making it more likely the mouse or rodent will fall from the plank 16.

Before continuing, it should be noted that the examples described above are provided for purposes of illustration, and are not intended to be limiting. Other devices and/or device configurations may be utilized.

FIGS. 5A-D illustrate implementation of the example mouse and rodent trap to trap a mouse or rodent. In an example, a mouse (or other rodent) moves out onto the plank 16 in search of the bait. The mouse or rodent reaches over the side of the plank 16 to reach the bait below the plank 16. The mouse may reach down toward the bait and fall off of the plank 16 and into a catch basin 20 below the plank 16. The plank 16 may also bend under weight of a mouse or rodent on the plank 16 reaching down toward bait on the bait drum 26, causing the mouse or rodent to fall from the plank 16. In addition, the bait drum 26 may rotate (either by rotation of the shaft 28 and/or the bait drum 26 on the shaft 28), causing the mouse to fall off of the plank 16 and into the catch basin 20, where it is either killed or captured for later release.

The mouse or rodent trap disclosed herein enables the end-user to choose whether to kill the mouse or rodent, or to capture and release the mouse or rodent (e.g., in a field). For example, the catch basin 20 may hold water if it is desired the mouse or rodent drown upon falling into the catch basin 20. In another example, the catch basin 20 may include sawdust or other material to provide a soft landing for the mouse or rodent for later release. In still another example, nothing need be provided in the catch basin 20. In any of these examples, the end-user does not need to physically handle the mouse. That is, the end-user can simply dump the contents of the catch basin 20 (e.g., into the trash if dead, or in a field for release).

Still other examples are also contemplated as will be readily apparent those having ordinary skill in the art after becoming familiar with the teachings herein.

The invention claimed is:

1. A trap for mice or other rodents, comprising:
   a base for arrangement over a catch basin;
   a shaft supported by the base;
   a bait drum mounted on the shaft; and
   a brace to rotatably support the shaft, the brace extending from the base on each side of an opening formed in the base, wherein the shaft is provided between each brace.

2. The trap of claim 1, wherein the bait drum has at least one concentric groove formed therein for a bait.

3. The trap of claim 1, wherein a mouse or rodent reaching down toward bait on the shaft causes the mouse or rodent to fall into the catch basin.

4. The trap of claim 1, wherein the shaft is assembled below a rim of the catch basin.

5. The trap of claim 1, wherein the catch basin filled at least partially with water.

6. The trap of claim 1, wherein the catch basin is filled at least partially with a soft landing material.

7. The trap of claim 1, further comprising a plank attached on one side to the base and loose on the other side.

8. A trap for mice or other rodents, comprising:
   a base supported over a catch basin;
   a shaft supported below the base at least partly inside the catch basin;
   a bait drum mounted on the shaft; and
   a brace to rotatably support the shaft, the brace extending from the base on each side of an opening formed in the base, wherein the shaft is provided between each brace.

9. The trap of claim 8, wherein the bait drum has at least one concentric groove formed therein for a bait.

10. The trap of claim 8, wherein a mouse or rodent reaching down toward bait on the shaft causes the mouse or rodent to fall into the catch basin.

11. The trap of claim 8, wherein the shaft is assembled below a rim of the catch basin.

12. The trap of claim 8, wherein the catch basin filled at least partially with water.

13. The trap of claim 8, wherein the catch basin is filled at least partially with a soft landing material.

14. The trap of claim 8, further comprising a plank attached on one side to the base and loose on the other side.

15. The trap of claim 8, wherein the brace includes a first brace on a first side of an opening formed in the base, and a second brace on a second side of the opening formed in the base, wherein the shaft is supported between the first brace and the second brace.

16. The trap of claim 8, further comprising a plank attached only on one end to the base.

* * * * *